United States Patent
Doiron et al.

(10) Patent No.: US 8,213,313 B1
(45) Date of Patent: Jul. 3, 2012

(54) METHODS AND APPARATUS FOR SHARED LAYER 3 APPLICATION CARD IN MULTI-SERVICE ROUTER

(75) Inventors: Timothy J. Doiron, Aurora, IL (US); Martin A. Cowen, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 148 days.

(21) Appl. No.: 12/424,015

(22) Filed: Apr. 15, 2009

(51) Int. Cl.
*H04L 12/26* (2006.01)
*H04L 12/28* (2006.01)

(52) U.S. Cl. ......... 370/235; 370/252; 370/254; 370/401

(58) Field of Classification Search .................. None
See application file for complete search history.

(56) References Cited

U.S. PATENT DOCUMENTS

| | | | | |
|---|---|---|---|---|
| 5,898,837 | A * | 4/1999 | Guttman et al. | 709/224 |
| 7,023,804 | B1 * | 4/2006 | Younes et al. | 370/236 |
| 7,331,061 | B1 * | 2/2008 | Ramsey et al. | 726/23 |
| 7,590,756 | B2 * | 9/2009 | Chan | 370/225 |
| 7,606,203 | B1 * | 10/2009 | Shabtay et al. | 370/332 |
| 7,710,867 | B1 * | 5/2010 | Masters | 370/229 |
| 7,836,160 | B2 * | 11/2010 | Baum | 370/235 |
| 2003/0043755 | A1 * | 3/2003 | Mitchell | 370/252 |
| 2004/0003284 | A1 * | 1/2004 | Campbell et al. | 713/201 |
| 2010/0322150 | A1 * | 12/2010 | Wilcoxson et al. | 370/321 |

* cited by examiner

*Primary Examiner* — Gregory Sefcheck
*Assistant Examiner* — Joshua Smith
(74) *Attorney, Agent, or Firm* — JW Law Group; James M. Wu

(57) ABSTRACT

An apparatus and method for enhancing packet transfer in a network using duplicated copy of data packets are disclosed. Upon classifying a data packet in accordance with a set of predefined packet identifiers, the method for enhancing packet transfer, in one embodiment, generates a replicated packet which is substantially similar to the data packet in response to the result of classification of the data packet. The replicated packet is subsequently forwarded to an application component via a route of non-bearer traffic for facilitating parallel processing.

18 Claims, 7 Drawing Sheets

METHODS AND APPARATUS FOR SHARED LAYER 3 APPLICATION CARD IN MULTI-SERVICE ROUTER

FIELD

The exemplary embodiment(s) of the present invention relates to network systems. More specifically, the exemplary embodiment(s) of the present invention relates to packet processing for various application services.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

As packet-based networks evolve and become ubiquitous, the need for delivering application aware services from providers has been rapidly increasing. A typical packet-based network, for example, combines both the physical interface (example 1 GigE or 10 GigE) and the application functions onto a common line card with the application processing occurring in-band on the data traffic. For instance, upon entering a router through a physical interface at an ingress component, a data packet proceeds through a network processing element and performs one or more application processing functions. After arriving at an egress component via a switching circuitry, the data packet is routed onto the backplane.

A drawback associated with a typical packet-based network is that an application process, such as real-time performance monitoring, viral scanning, or deep packet inspection ("DPI") of data traffic passing through routers, can be performance degradation as well as less reliability. Another drawback associated with a conventional packet-based network is that the application processor needs to be replicated on each card that is required to provide the application process. Replicating application processor on multiple cards increases overall equipment costs and power consumption.

SUMMARY

A network system discloses a method for enhancing packet transfer in a network using duplicated copy of data packets. Upon classifying a data packet in accordance with a set of predefined packet identifiers, the system, in one embodiment, generates a replicated packet that has the same content as the data packet in accordance with the result of classification of the data packet. The replicated packet is subsequently forwarded to an application component via a non-bearer path to facilitate parallel processing.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
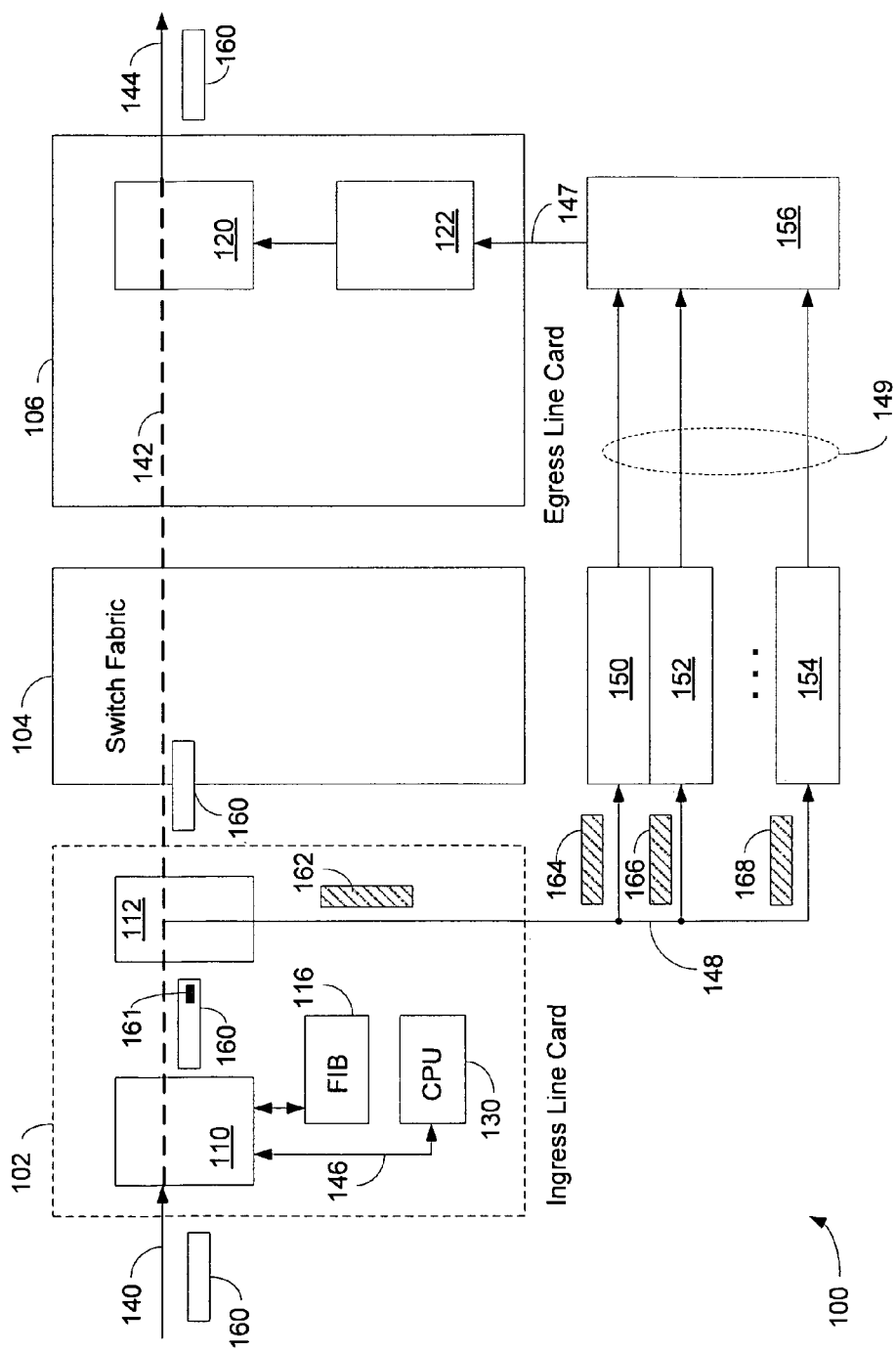
FIG. 1A is a block diagram illustrating a network configuration capable of duplicating a data packet for performance enhancement in accordance with one embodiment of the present invention.

Exemplary embodiment(s) of the present invention is described herein in the context of a method, device, and apparatus of parallel packet processing using duplicated data packet.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network system, in one embodiment, is capable of enhancing packet transfer using parallel packet processing with duplicated copy of data packets. Upon classifying a data packet in accordance with a set of predefined packet identifiers, the system generates a replicated packet which is substantially similar to the data packet in response to the result of classification of the data packet. The replicated packet is subsequently forwarded to an application component such as a performance monitor via a non-bearer traffic to facilitate parallel packet implementation.

It should be noted that the term "data packet" can also be referred to as a "packet," "a packet stream," "data stream," "data," "data frames," "frames," and the like. In addition, the term "duplicated packet" can also be referenced as "replicated packet," "copy of packet," et cetera.

FIG. 1A is a block diagram 100 illustrating a network configuration capable of duplicating a data packet for performance enhancement in accordance with one embodiment of the present invention. Diagram 100 illustrates an ingress component 102, a switch fabric 104, and an egress component 106. In one embodiment, diagram 100 further includes multiple application processors or components 150-154, wherein the application processors 150-154 can reside in one application card or multiple application cards. It should be noted that the underlying concept of the exemplary embodiment(s) of the present invention would not change if one or more blocks (or elements or connections) were added to or removed from diagram 100.

Ingress component 102, also known as an ingress line card, includes a classifier 110, a central processing unit ("CPU") 130, a forwarding information base ("FIB") 116, and a replicate element 112. Classifier 110, also known as a packet classifier or an ingress classifier, is loaded with classifying information such as packet identifiers ("IDs") to recognize packet formats for routing. Classifier 110, in one example, matches header information in the packet header against predefined patterns such as packet IDs stored in FIB 116. The examples of packet information patterns and/or "packet IDs" can be IP destination address, Ethernet MAC destination address, QoS marking bits, and the like. Alternatively, information relating to classification policy, such as TCP, UDP port numbers, matching 5-tuple information, and packet length, may also be used to classify an incoming data packet. Once the packet is classified, a classification or duplication marker is added to an internal section of the packet header before it is forwarded to an egress port or an interface. Note that destination lookup information can also be obtained from the lookup table in FIB 116.

FIB 116, in one embodiment, includes a lookup table(s) containing destination information relating to various data packets. In addition, FIB 116 may also include ingress policies which are used to regulate the processing and forwarding of incoming packet traffic. Policies facilitate proper or fair services for all inbound traffic flows. Information stored in FIB 116, in one example, is populated by CPU 130 via control plane mechanisms, such as routing protocols, address learning, policy forwarding rules, etc. FIB 116 contains searchable table(s) matching egress port/interface with "information patterns" from incoming packets such as IP destination address.

Replicate element 112, in one embodiment, generates a duplicated packet which is the same or substantially the same as the incoming data packet 160. For example, replicate element 112 can duplicate one or more copies of packets 162-168 in accordance with the incoming data packet 160. Depending on the application, copied or replicated packets 162-168 may be the same copy or multiple copies. In one embodiment, replicate element 112 is capable of replicating a copy of the incoming packet 160 if packet 160 is marked for duplication 161. Marker for duplication 161, in one embodiment, is encapsulated into packet 160 by classifier 110. Note that replicate element 112 can be incorporated into switch fabric 104. It should be noted that classifier 110, replicate element 112, and FIB 116 may be fabricated onto the same device.

CPU 130 is a processing device capable of dealing with any control plane processes such as route computation, address learning, filtering process, policy computation, policy enforcement, management/configuration, and so on. While CPU 130 is coupled to classifier 110 via connection 146, CPU 130 can also be configured to control processing activities in ingress component 102, switch component 104, and egress component 106. It should be noted that ingress component 102 may include other devices such as ingress per-flow-queues, but they are not necessary for understanding the embodiments of the present invention.

Switching fabric 104 is a network switching apparatus capable of switching a data stream or packet from an input point to a corresponding output point. Switching fabric 104, for example, includes switching units (individual boxes) in a node and is programmed to control switching paths. In one aspect, switching fabric 104 is coupled to CPU 130 for facilitating packet switching.

Egress component 106, also known as egress line card, includes an output element 120 and an adjustment element 122, wherein output element 120 is an exit point for a packet or a packet stream. Output element 120 and adjustment element 122, in one embodiment, are used to provide egress filtering function which is capable of blocking a data flow or traffic from leaving egress component 106. Note that output element 120 and adjustment element 122 can be merged into one logic block. Egress component 106 may include other components such as aggregate strict priority (SP) and/or weighted queues, but they are not necessary for understanding the embodiments of the present invention.

As shown in FIG. 1A, a data packet 160 or packet 160 enters ingress component 102 via a data path 140 and exits egress component 106 via a data path 144. In one embodiment, data path 142, which facilitates the passage of packet 160 through the routing system from data path 140 to data path 144, is a bearer path. Bearer path 142 can also be referred to as an in-band traffic, serial path, and bearer traffic. In one embodiment, a secondary data path 148 is used to transport duplicated packet(s) 162. Secondary data path 148 can also be referred to as a duplicated data path, a bypass, a replicated traffic, a non-bearer path, and the like. Duplicated packet 162, for example, may be further replicated to multiple duplicated packets 164-168 before they are being forwarded to application processors 150-154, respectively. It should be noted that application processors 150-154 can be situated in multiple application cards or a single application card.

Application processor 150, in one embodiment, is a security application used for scanning virus and application processor 152 is a performance monitoring application used for monitoring quality of service ("QoS") and/or DPI for various applications. Application processor 154 is a surveillance application used for observing certain packet streams. The results from processors 150-154, in one embodiment, are fed to a result analysis controller 156 via data paths 149. It should be noted that controller 156 can be integrated into egress component 106. While bearer path 142, for example, is capable of handling wire-speed or in-line rate, secondary data paths 148-149 may also be able to handle the near real-time or near in-line rate.

During an operation, upon receipt of packet 160, classifier 110 classifies packet 160 in accordance with predefined packet IDs fetched from FIB 116. After marking packet duplication, classifier 110 encapsulates a duplication marker 161 in packet 160 and sends packet 160 with marker 161 to replicate element 112. Once a replicated copy 162 of packet 160 is generated, replicate element 112 forwards packet 160 to switch fabric 104 via bearer path 142. At the same time, replicate element 112 also sends replicated copy 162 to application processors 150-154 via secondary data path 148. While packet 160 is being switched through switch fabric 104, replicated packet(s) 164-168 are being processed by application processors 150-154. The results of the application processors 150-154 are subsequently forwarded to result analysis controller 156. Controller 156 generates various signals including warnings, adjusts, and notifications in accordance with the results received from processors 150-154 across paths 149. Depending on the applications, adjust signals and/or warning signals entering from controller 156 to adjustment element 122 via connection 147 may reach egress component 106 at similar or same time as packet 160 reaches egress component 106. In one embodiment, output element 120 has sufficient time to block packet 160 from leaving egress component 106 in response to warning signal(s) from controller 156.

For example, a router having a shared application card is capable of enabling non-real time analysis and monitoring of specifically identified traffic traveling through the router. Instead of routing all traffic through the application processing function serially or in-band, data packet is identified at ingress wherein the identified packet is then replicated at switch fabric 104. After replication, the duplicated copy of packet(s) is sent to the application card via a secondary data path 148. The parallel packet processing, in one embodiment, is occurred when packet 160 travels through switch fabric 104 at the same time as the replicated packet(s) 164-168 enter application processors 150-154. Note that duplicated packet may be processed at a near real time. The application card, for example, can be configured to perform security monitoring for packet traffic for viral or malware scanning. Alternatively, the application card can also be configured to monitor routing traffic to determine if service-level-agreements ("SLAs") are being met. In addition, the application card may direct the router to make adjustments if SLAs are failed to meet.

In another embodiment, any mixture and/or combining of I/O cards and application cards can be achieved in the chassis to optimize device performance. When additional applications are needed, for example, extra application cards are installed in open slots on the chassis and replicated traffic or secondary data path can be subsequently directed to the newly installed application cards. The ability of mixing and matching of I/O cards and application cards in any ratio to optimize device performance can be important to provide additional flexibilities for upgrades as well as enhancements.

An advantage of having an architecture in which the application processing is done on a mirrored copy of the data stream is that the application processing does not lie serially in the data path. In other words, the application processor does not increase packet latency or delay. Another advantage of using a replicated copy of a data packet is that, by operating on a copy of the packet, the processing does not have to operate at wire-speed. Stated another way, the replicated traffic can suffer latency delays without degradation of the original data stream. By removing the need to operate on the bearer traffic, overall system reliability can also be improved.

Also, network operators can add as many cards as they need to handle a specific application. Additionally, the application cards can be easily upgraded to handle new applications or perform faster processing without affecting traffic. Another advantage of a Layer 2 and Layer 3 data switching and routing is that the cost-effective performance monitoring, diagnostics and added packet intelligence can be implemented accordingly. The present embodiment(s) of the invention is applicable to any IP/MPLS/Ethernet packet router or switch.

Figure 1B:
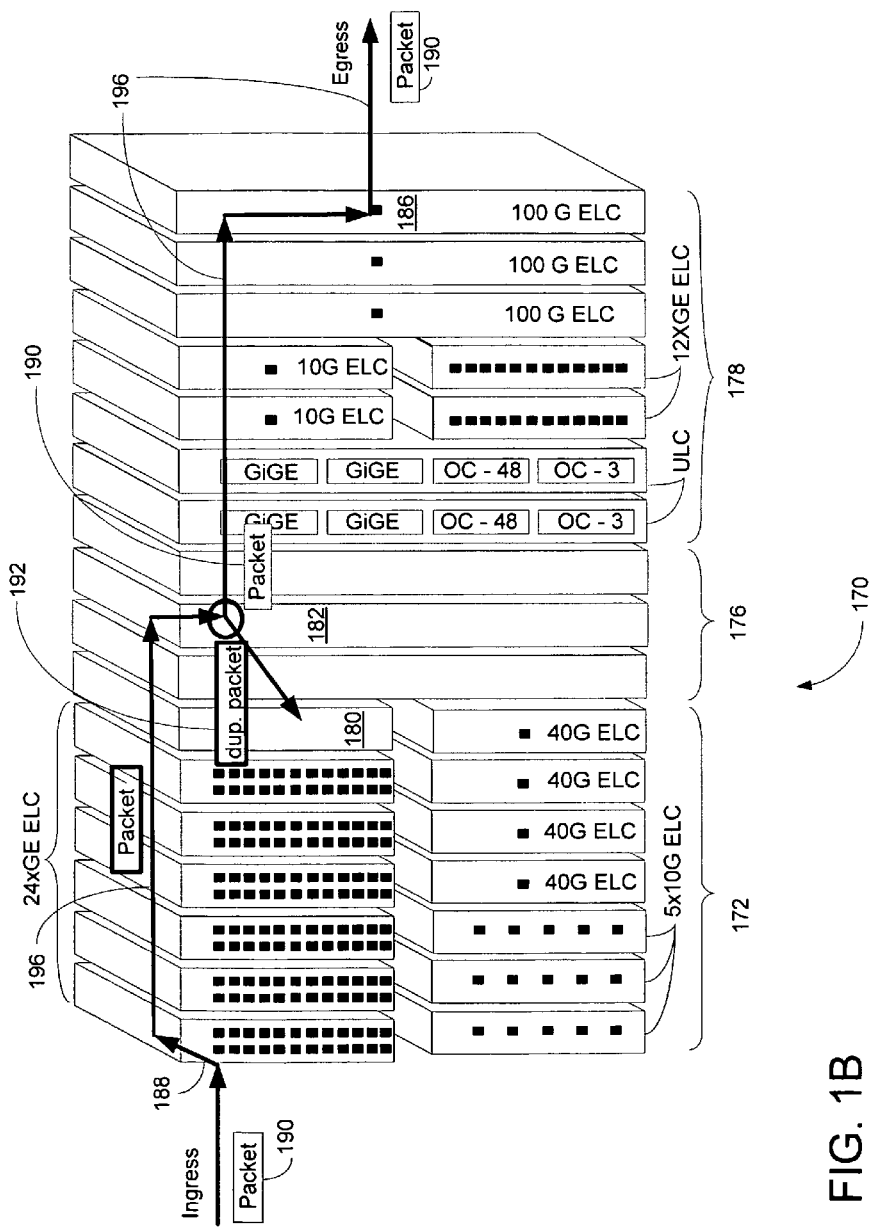
FIG. 1B is a block diagram illustrating an exemplary network system capable of duplicating a data packet in accordance with one embodiment of the present invention.

FIG. 1B is a block diagram 170 illustrating an exemplary network system capable of duplicating a data packet in accordance with one embodiment of the present invention. Diagram 170 includes various ingress Ethernet line cards ("ELCs") 172, switching cards 176, and egress ELCs 178. ELCs can also be application line cards and I/O cards plug into a backplane or chassis, not shown in FIG. 1B. It should be noted that the underlying concept of the exemplary embodiment(s) of the present invention would not change if one or more blocks (or elements or connections) were added to or removed from diagram 170.

When a packet 190 enters ELC 188, it proceeds to switching card 182 via the backplane. Before card 182 routes packet 190 through its switching mechanism, a duplicated packet 192 is replicated in accordance with packet 190. Duplicated packet 192 is subsequently sent to an application card 180 for application processing while packet 190 travels to egress ELC 186 via a bearer traffic or path 196.

In operation, after provisioning, policies, and management initialization, an ingress classifier is created. The classifier tells the router which packets to mark for packet replication. For example, the router could mark all packets with a particular source IP address or it could mark all packets with a particular Ethernet virtual local area network ("VLAN") tag or any combination of packet identifiers, such as transmission control protocol ("TCP"), user datagram protocol ("UDP"), Internet protocol ("IP"), multiprotocol label switching ("MPLS") or Ethernet header structures. Once a packet is marked for replication, the packet proceeds to the backplane and enters the switch fabric. The switch fabric sees the packet as marked for replication and thus makes an exact duplicate copy of the packet. The original packet is forwarded onto the egress line card, while the replicated packet is sent to the application resource card for additional near-real-time processing. Application processing as mentioned previously can be for performance monitoring (latency, jitter, etc.), viral scanning, or for DPI to identify the application contents of the packet (e.g. video, voice, Internet web browsing).

Figure 1C:
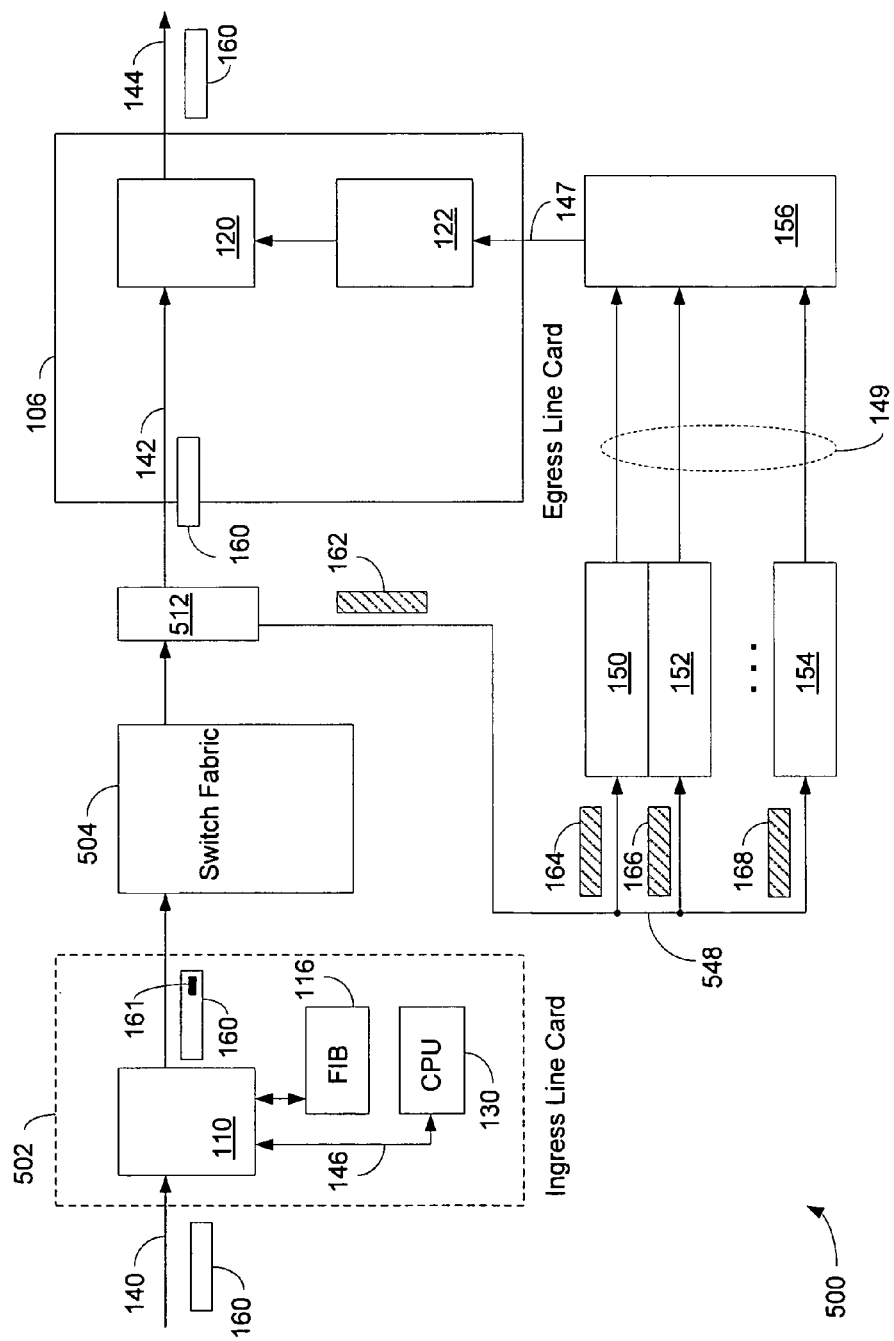
FIG. 1C is a block diagram illustrating an alternative configuration capable of duplicating a data packet for performance enhancement in accordance with one embodiment of the present invention.

FIG. 1C is a block diagram 500 illustrating an alternative configuration capable of duplicating a data packet for performance enhancement in accordance with one embodiment of the present invention. Diagram 500 illustrates an ingress component 502, a switch fabric 504, and an egress component 106. In one embodiment, diagram 100 further includes a replicate element 512 and multiple application processors or components 150-154, wherein the application processors 150-154 can reside in one application card or multiple application cards. It should be noted that the underlying concept of the exemplary embodiment(s) of the present invention would not change if one or more blocks (or elements or connections) were added to or removed from diagram 500.

Ingress component 502, also known as an ingress line card, includes classifier 110, CPU 130, and FIB 116. Ingress component 502, in one embodiment, is similar to ingress component 102 shown in FIG. 1A except that ingress component 502 does not include replicate element 112. After receipt of an incoming data packet 160, ingress component 502 classifies data packet 160 and inserts a duplication marker 161 before sending data packet 160 to switch fabric 504. Switching fabric 504, similar to switch fabric 104 illustrated in FIG. 1A, is a network switching apparatus capable of switching a data stream or packet from an input port to a corresponding output port.

Replicate element 512 is configured to duplicate data packet 160 after it travels through switch fabric 504. In one embodiment, replicate element 512 is part of switch fabric 504. Alternatively, replicate element 512 can be configured to be part of egress component 106. Like replicate element 112 as shown in FIG. 1A, replicate element 512 generates a duplicated packet which is the same or substantially the same as the incoming data packet 160. Replicate element 512 is capable of duplicating one or more copies of data packets 162-168 in accordance with data packet 160. Depending on the application, copied or duplicated packets 162-168 may be the same copy or multiple separate copies.

During an operation, upon receipt of incoming data packet 160, ingress line card 502 marks or tags the traffic for replication such as setting a replicate bit in the header and subsequently forwards data packet 160 to switch fabric 504. After switching (or routing) process between input ports and corresponding output ports, data packet 160 is forwarded from switch fabric 504 to replicate element 512 for packet replication. After replication, data packet 160 continues to travel to egress line card 106 while duplicated packet 162 or duplicated packets 164-168 proceed to application processor or application processors 150-154.

In another embodiment, switch fabric 504 includes its own classification engine and it could decide which data packet should be replicated. For example, a classification engine can set a rule indicating that 10% of the traffic passing through switch fabric 504 should be randomly duplicated for certain application processors, such as performance monitoring, DPI inspection and/or viral/malware scanning. Depending on applications, replicate element 512 can be an independent circuitry, a part of switch fabric 504, or a part of egress component 106. An advantage of implementing packet replication at or after switch fabric 504 is to improve throughput of switch fabric 504. For example, switch fabric does not need to allocate resources to handle duplicated packets if the duplication happens after switch fabric 504.

Figure 2A:
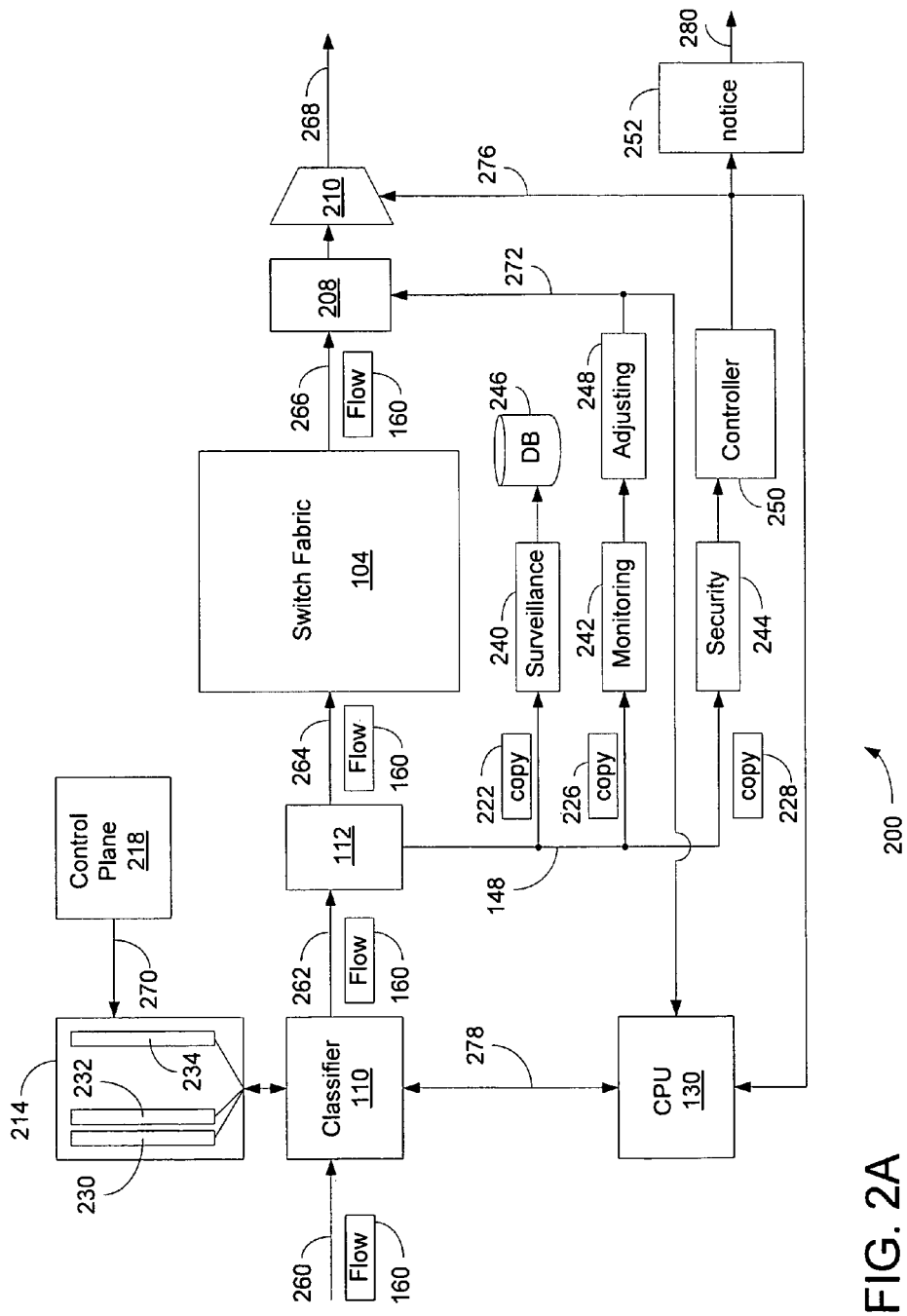
FIG. 2A is a logic block diagram illustrating a network system using replicated packet to facilitate parallel packet processing in accordance with one embodiment of the present invention.

FIG. 2A is a logic block diagram 200 illustrating a logical packet flow using replicated packet to facilitate parallel packet processing in accordance with one embodiment of the present invention. Diagram 200 includes classifier 110, replicate element 112, switch fabric 104, CPU 130, an egress component 208, and application processors 240-244. Diagram 200 further includes a database ("DB") 246, a lookup table 214, an adjusting element 248, a controller 250, and a notice circuit 252. It should be noted that the underlying concept of the exemplary embodiment(s) of the present invention would not change if one or more blocks (or elements or connections) were added to or removed from diagram 200.

Lookup table 214, which could be FIB 116 or a part of FIB 116, contains various routing policies 230-234, packet IDs, and provisioning information. Lookup table 214 is coupled to a control plane 218 via connection 270. Control plane 218, in one embodiment, is a workstation in which a user or network administrator can set up the policies and provisioning devices. Note that connection 270 can be any kind of connecting mechanism such as wired or wireless communications.

A network system capable of parallel processing packets using replicated data packets includes ingress classifier 110, a replicate component 112, and an application component 240 or 242 or 244. In one embodiment, ingress classifier 110 is configured to mark an incoming data packet 160 for duplication in accordance with predefined packet IDs 230-234. Replicate component 112 is coupled to ingress classifier 112 via connection 262 and is configured to replicate a copy of the incoming data packet in accordance with a duplication marker. Secondary data path or non-bearer path 148 is used to transfer replicated packets 222-228 from replicate component 112 to processors 240-244. Processor 240-244 are capable of processing copies of incoming data packet 222-228 in accordance with application processing functions. The system is further configured to pass the incoming data packet to an output port via switch fabric 104. Egress component 208 is configured to route the incoming data packet to its destination. Application component 244, for example, is a security application line card capable of scanning virus in the copy of the incoming data packet 228.

For a surveillance application, surveillance process observes replicated packet 222 and selectively stores at least a portion of the observed information in DB 246. Depending on the applications, surveillance process can be calibrated to store different portion of the information from replicated packet 222 in different databases. For example, surveillance application process is capable of separating audio data from video data and storing them in different storage locations.

For a monitoring application, monitoring application process 242 can be calibrated to a passive monitoring or an active monitoring. Passive monitoring of the application process is to monitor performance of a specific packet(s) and forward the records of the performance to network administrators or CPU 130 via 272. Active monitoring of the application process, on the other hand, can alter the routing process to speed up routing if the monitoring application detects that the detected performance record fails to meet with predefined SLAs.

For a security application, security application process 244 can be calibrated to a passive scanning, active scanning, or both. Passive scanning, for example, is to scan virus and notify notice element 252 if a virus has been detected. Notice 252 subsequently issues or broadcasts a virus warning. Alternatively, an active scanning, for example, is to block packet 160 from leaving the system by turning off multiplexer 210 via connection 276. At the same time, controller 250 also notifies CPU 130 via connection 176 regarding viral detections.

In addition, other types of application process are possible. For example, application processes can include application performance monitoring to handset or portable wireless device, video caching of contents security, mirroring IPTV and video multicast, mobile units, business and residential non-real-time DPI, flow identification (not directly in bearer traffic stream), and the like.

Figure 2B:
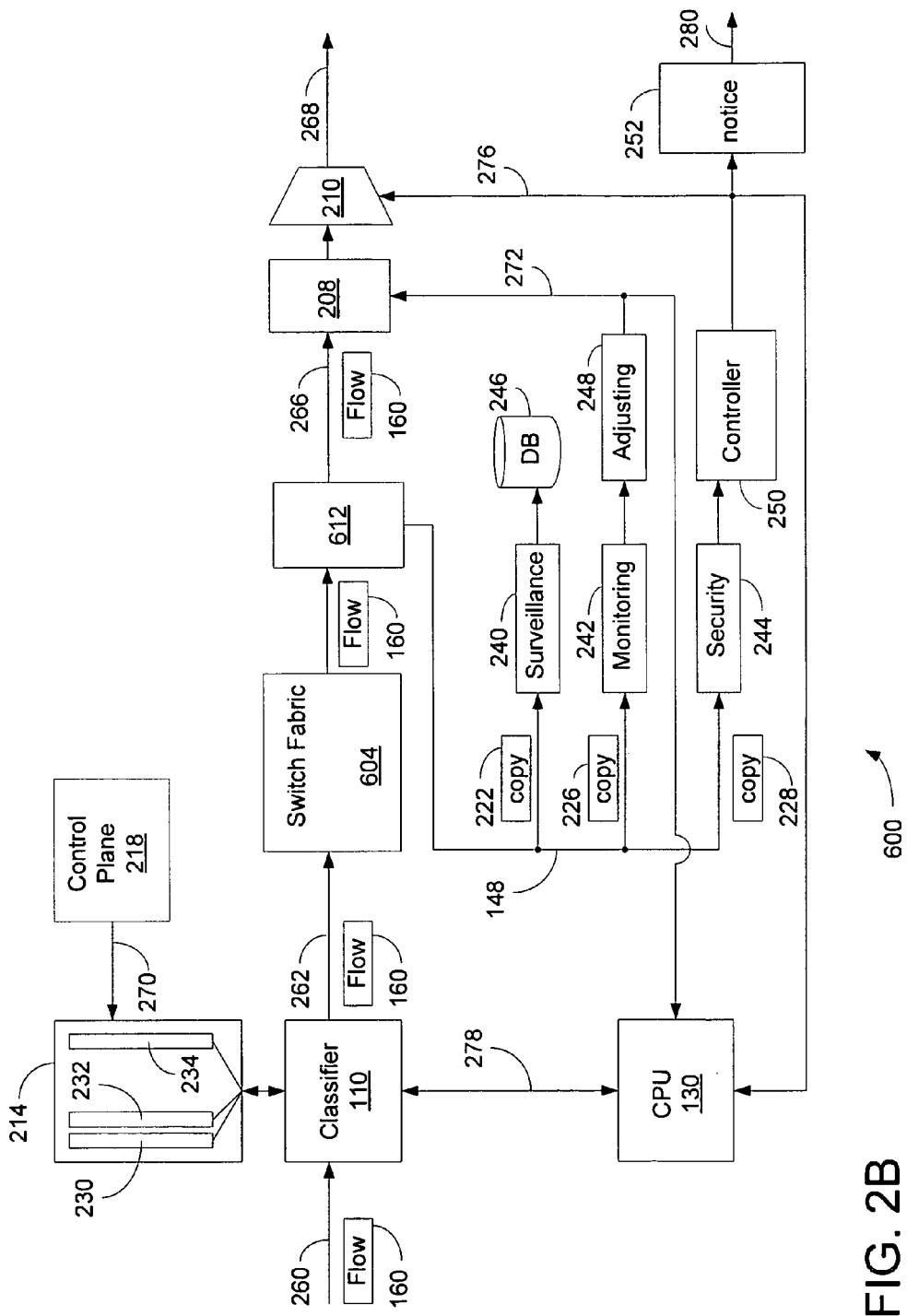
FIG. 2B is a logic block diagram illustrating an alternative network system using duplicated packet to facilitate parallel packet processing in accordance with one embodiment of the present invention.

FIG. 2B is a logic block diagram 600 illustrating an alternative network system using duplicated packet to facilitate parallel packet processing in accordance with one embodiment of the present invention. Diagram 600 includes classifier 110, replicate element 612, switch fabric 604, CPU 130, egress component 208, and application processors 240-244. The system illustrated by diagram 600 is similar to the system illustrated by diagram 200 except that logic location of replicate element 612 is moved from the ingress component to switch fabric 604. It should be noted that the underlying concept of the exemplary embodiment(s) of the present invention would not change if one or more blocks (or elements or connections) were added to or removed from diagram 200.

Replicate element 612 is configured to duplicate data packet 160 after it travels through switch fabric 604. In one embodiment, replicate element 612 is part of switch fabric 604. Alternatively, replicate element 612 can be configured to be part of an egress component 208. As replicate element 512 as shown in FIG. 1C, replicate element 612 generates a duplicated packet which is the same or substantially the same as incoming data packet 160. Replicate element 612 duplicates one or more copies of data packets 222-228 in accordance with incoming data packet 160. Depending on the application, copied or replicated packets 222-228 may be the same copy or multiple separate copies.

During an operation, upon receipt of incoming data packet 160, classifier 110 marks or tags the traffic for replication such as setting the replicate bit and forwards data packet 160 to switch fabric 604. After switching (or routing) process between input and output ports, data packet 160 is forwarded from switch fabric 604 to replicate element 612 for packet replication. After replication, data packet 160 continues to travel to egress line card 208 while duplicated packet or duplicated packets 222-228 proceed to application processor or application processors 240-244.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 3:
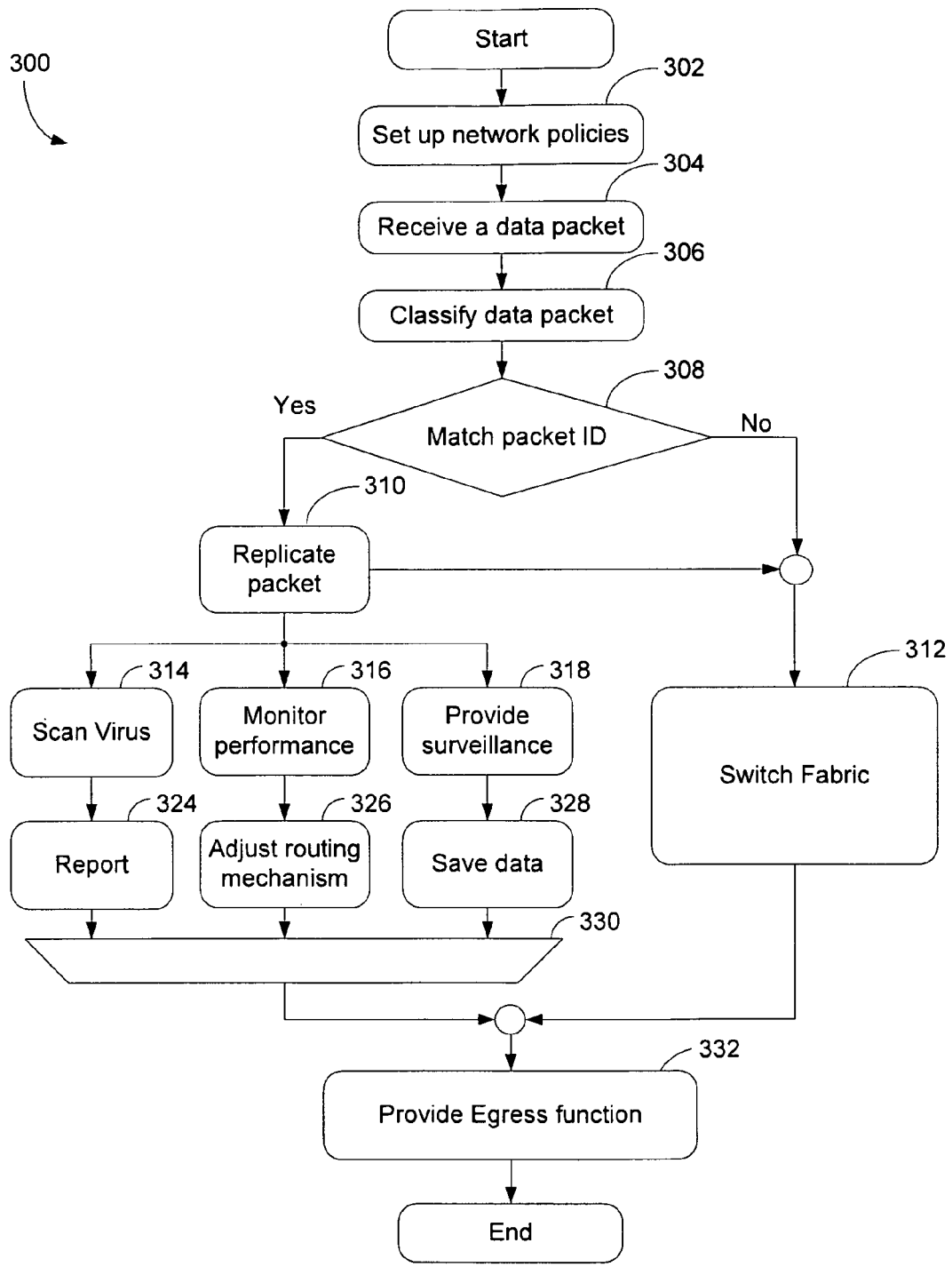
FIG. 3 is a flowchart illustrating a process of packet duplication for parallel packet processing in accordance with one embodiment of the present invention.

FIG. 3 is a flowchart 300 illustrating a process of packet duplication for parallel packet processing in accordance with one embodiment of the present invention. At block 302, the process sets up various network policies including predefined packet IDs, provisioning, and management policies. In one embodiment, the network policies are entered by a user, an administrator, or a logic circuitry. Upon receipt of an incoming data packet at block 304, the packet is classified at block 306 in accordance with the network policies as well as provisioning and management policies. The data packet, for example, can also be a data stream, a packet stream, a frame, and a stream of frame. At block 308, the process determines whether the packet matches with at least one of the predefined packet ID. If the packet matches with a predefined packet ID, the process moves to block 310. Otherwise, the process proceeds to block 312. Block 312 provides a function of switch fabric.

At block 310, the replicated packet is generated in accordance with the incoming data packet. Alternatively, multiple replicated packets may be generated in accordance with the incoming data packet. After replication, while the incoming data packet proceeds to block 312, the replicated packet or packets travel to blocks 314-318 for application processing. At block 314, the process scans virus or worms or spy wares against the replicated packet. After scanning, the process reports the viral scanning result at block 324. The result of viral scanning is subsequently fed to block 330.

At block 316, the process monitors the performance of data routing in connection with the packet. After generation of result(s) of the monitoring, the process proceeds to block 326 to adjust the routing mechanism in accordance with the result of monitoring. Alternatively, the process, at block 326, can just report the result of monitoring to a network administrator or a CPU. The result of monitoring subsequently enters block 330.

At block 318, the process observes the content of a particular type of packets and/or performs a DPI to extract information. Upon saving the result of surveillance, the result is stored at block 328. An output of block 328 enters block 330 for processing the result information. The output of the result information is then merged with the output of switch fabric from block 312. At block 332, the process provides egress functions in response to the merged results from block 312 and 330. After block 332, the process ends.

Figure 4:
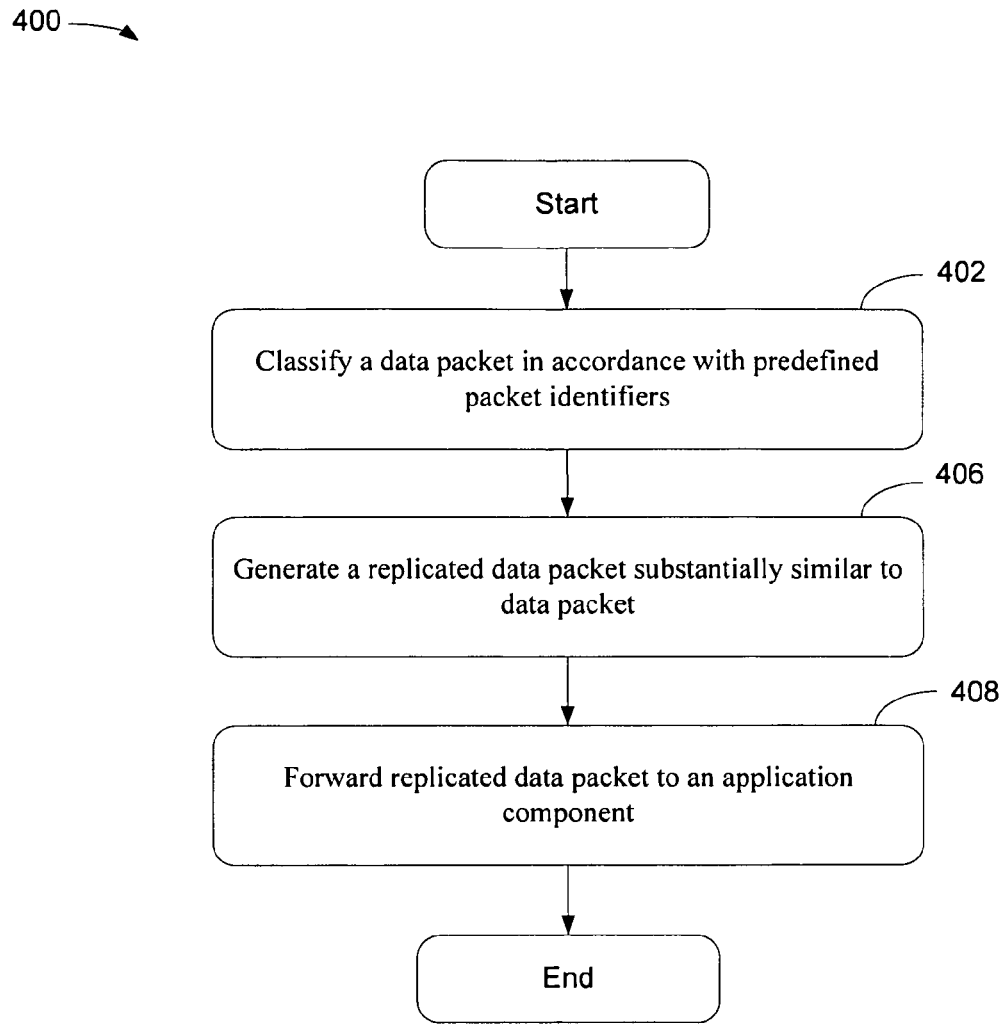
FIG. 4 is a flowchart illustrating an exemplary process of packet replication in response to predefined packet identifiers in accordance with one embodiment of the present invention.

FIG. 4 is a flowchart 400 illustrating an exemplary process of packet replication in response to predefined packet identifiers in accordance with one embodiment of the present invention. At block 402, a process of data transfer classifies a data packet in accordance with a set of predefined packet IDs. Upon obtaining policies relating to provisioning and servicing information via a network administrator, the process receives a data packet from a network. Each incoming data packet is classified by an ingress classifier in accordance with the policies. For example, the process can identify the data packet in accordance with a source IP address of the predefined packet IDs. Also, the process can identify the data packet in accordance with one of a set of Ethernet VLAN addresses.

At block 406, the process generates a replicated packet wherein the content of the replicated packet is substantially the same the content of the incoming data packet in view of a result of classification of the data packet. A replication or duplication marker can be encapsulated in a location of the header of packet. In one embodiment, the process forwards the data packet to an egress line card coupled to a chassis via a switch fabric through a bearer traffic.

At block 408, the process forwards the replicated packet to an application component via a route of non-bearer traffic for facilitating parallel processing. For example, the data packet is obtained at an ingress line card. The replicated packet, in one embodiment, is forwarded to a secure application card for security scanning. Alternatively, the replicated packet is sent to a performance application card for performance monitor. Also, the process is capable of sending the replicated packet to a surveillance application for DPI analysis. It should be noted that duplication of an incoming packet can facilitate packet parallel processing.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for data transfer in a network, comprising:
receiving a data packet at an ingress component of a router;
classifying the data packet in accordance with a plurality of predefined packet duplicating identifiers and encapsulating a replicate marker in a header location of the data packet;
generating a replicated packet substantially similar to the data packet in response to a result of classification of the data packet;
forwarding the replicated packet to an application component situated inside of the router via a route of non-bearer traffic for performance monitor and facilitating parallel processing; and
adjusting output packet in response to an adjust signal from a result analysis controller via a non-bearer traffic.

2. The method of claim 1, further comprising:
obtaining policies relating to provisioning and servicing information via a network administrator; and
receiving the data packet from a network.

3. The method of claim 2, further comprising activating an ingress classifier capable of classifying each incoming data packet in accordance with the policies.

4. The method of claim 1, wherein classifying the data packet in accordance with a plurality of predefined packet duplicating identifiers includes identifying the data packet in accordance with a source Internet Protocol ("IP") address of the plurality of predefined packet identifiers.

5. The method of claim 1, wherein classifying the data packet in accordance with a plurality of predefined packet duplicating identifiers includes identifying the data packet in accordance with one of a plurality of Ethernet virtual local area network ("VLAN") addresses.

6. The method of claim 1, wherein generating a replicated packet further includes forwarding the data packet to an egress line card in a chassis via a switch fabric through a bearer traffic.

7. The method of claim 1, wherein forwarding the replicated packet to an application component further includes forwarding the replicated packet to a secure application card for security scanning.

8. The method of claim 1, wherein forwarding the replicated packet to an application component further includes sending the replicated packet to a performance application card for monitoring quality of service or providing deep packet inspection.

9. The method of claim 1, wherein forwarding the replicated packet to an application component further includes sending the replicated packet to a surveillance application for deep packet inspection.

10. A method for network routing, comprising:
obtaining a plurality of predefined packet identifiers and a plurality of predefined service policies;
classifying a data packet arrived at an ingress line card of a router in accordance with the plurality of predefined packet identifiers and the plurality of predefined service policies and encapsulating a replicate marker in a header location of the data packet;
replicating a duplicated copy of the data packet in response to a result of classification of the data packet;
routing the data packet to an egress line card of the router via a switch fabric;
forwarding the duplicated copy of the data packet to an application card of the router for performance monitor; and
adjusting output packet in response to an adjust signal from a result analysis controller via a non-bearer traffic.

11. The method of claim 10, further comprising scanning virus in the duplicated copy of the data packet during a security application process.

12. The method of claim 11, further comprising issuing a warning when virus is detected in the duplicated copy of the data packet.

13. The method of claim 10, further comprising monitoring performance of the duplicated copy of the data packet in accordance with quality of service ("QoS") of the plurality of predefined service policies.

14. The method of claim 10, further comprising performing a deep packet inspection to identify application contents of the duplicated copy of the data packet.

15. The method of claim 10, further comprising providing surveillance capability for observing information carried by the duplicated copy of the data packet in accordance with a predefined network device.

16. A network apparatus for replicating data packets, comprising:
an ingress classifier, including hardware or a combination of hardware and software, configured to encapsulate a duplication marker in a head location of an incoming data packet for duplication in accordance with a plurality of predefined packet identifiers;
a replicate component, including hardware or a combination of hardware and software, coupled to the ingress classifier and configured to replicate a copy of the incoming data packet in accordance with the duplication marker; and
an application component, including hardware or a combination of hardware and software, coupled to the replicate component and capable of processing the copy of the incoming data packet in accordance with an application processing function of performance monitor, wherein the application component provides a signal for adjusting output packet via a non-bearer traffic.

17. The apparatus of claim 16, further comprising:
a switch fabric, including hardware or a combination of hardware and software, coupled to the ingress classifier and configured to pass the incoming data packet to an output port; and
an egress component, comprising hardware or a combination of hardware and software, coupled to the switch fabric and configured to route the incoming data packet to its destination.

18. The apparatus of claim 16,
wherein the application component is a security application line card capable of scanning virus in the copy of the incoming data packet;
wherein replicate component is capable of forwarding the copy of the incoming data packet to the security application line card.

* * * * *